US009866602B2

(12) United States Patent
Tash et al.

(10) Patent No.: US 9,866,602 B2
(45) Date of Patent: Jan. 9, 2018

(54) ADAPTIVE BIT RATES DURING BROADCAST TRANSMISSION IN DISTRIBUTED CONTENT DELIVERY NETWORKS

(71) Applicant: Kontiki, Inc., Sunnyvale, CA (US)

(72) Inventors: Jonathan King Tash, Tucson, AZ (US); Stephen J. Blankenship, Roseville, CA (US)

(73) Assignee: Kollective Technology, Inc., Sunnyvale, CA (US)

( * ) Notice: Subject to any disclaimer, the term of this patent is extended or adjusted under 35 U.S.C. 154(b) by 114 days.

(21) Appl. No.: 14/516,528

(22) Filed: Oct. 16, 2014

(65) Prior Publication Data

US 2016/0112483 A1   Apr. 21, 2016

(51) Int. Cl.
*H04L 29/08* (2006.01)
*H04L 29/06* (2006.01)

(52) U.S. Cl.
CPC ...... *H04L 65/4092* (2013.01); *H04L 65/4084* (2013.01); *H04L 65/604* (2013.01); *H04L 65/80* (2013.01); *H04L 67/1044* (2013.01); *H04L 67/1063* (2013.01); *H04L 67/1068* (2013.01); *H04L 67/2852* (2013.01)

(58) Field of Classification Search
CPC .................................................. H04L 67/2852
USPC .................................................. 709/224, 225
See application file for complete search history.

(56) References Cited

U.S. PATENT DOCUMENTS

| 2006/0171423 | A1* | 8/2006 | Helms | H04J 3/1682 370/535 |
| 2009/0168795 | A1* | 7/2009 | Segel | H04L 67/104 370/429 |
| 2009/0172179 | A1 | 7/2009 | Miao et al. | |
| 2010/0250654 | A1* | 9/2010 | Hirano | G06F 17/30893 709/203 |
| 2011/0258322 | A1 | 10/2011 | Luzzatti et al. | |
| 2012/0221640 | A1 | 8/2012 | Cohen | |

* cited by examiner

*Primary Examiner* — Adnan Mirza
(74) *Attorney, Agent, or Firm* — Park, Vaughan, Fleming & Dowler LLP

(57) ABSTRACT

The disclosed embodiments provide a system that facilitates broadcast transmission in a distributed content delivery network. The system includes a node in the distributed content delivery network that plays a content stream received over the distributed content delivery network. The node includes a leadership-management apparatus that identifies the node as a peer leader in a local network of the distributed content delivery network. The node also includes a broadcasting apparatus. Upon identification of the node as the peer leader, the broadcasting apparatus obtains the content stream from a content source, broadcasts the content stream to other nodes in the local network, and adjusts a bit rate of the content stream based on one or more attributes associated with obtaining the content stream from the content source.

14 Claims, 6 Drawing Sheets

clients may cause difficulties in selecting an appropriate bit rate for content to be shared among a set of peers.

Consequently, distribution and playback of content to clients across multiple networks and/or physical locations may be facilitated by mechanisms for dynamically detecting and managing network and/or playback issues on the clients.

ADAPTIVE BIT RATES DURING BROADCAST TRANSMISSION IN DISTRIBUTED CONTENT DELIVERY NETWORKS

RELATED APPLICATION

The subject matter of this application is related to the subject matter in a co-pending non-provisional application by inventors Wade L. Hennessey and John B. Wainwright, entitled "Method and Apparatus for Establishing Peering Rules for Distributed Content Delivery," having Ser. No. 10/611,783, and filing date 30 Jun. 2003.

The subject matter of this application is also related to the subject matter in a co-pending non-provisional application by inventors Stephen Blankenship and Jay Harel and filed on the same day as the instant application, entitled "Broadcast Readiness Testing in Distributed Content Delivery Networks," having Ser. No. 14/516,517 and filing date Oct. 16, 2014.

BACKGROUND

Field

The disclosed embodiments relate to techniques for providing adaptive bit rate streaming. More specifically, the disclosed embodiments relate to techniques for providing adaptive bit rates during broadcast transmission in distributed content delivery networks.

Related Art

Improvements in the capabilities and numbers of electronic devices have resulted in the increased distribution of digital content to the electronic devices. For example, video, audio, and/or other types of media streams may be transmitted to multiple personal computers, laptop computers, mobile phones, tablet computers, and/or other network-enabled electronic devices using Internet-based content providers and/or content delivery networks.

However, bandwidth consumed by digital content delivery may interfere with playback of the content and/or other network access on the electronic devices. For example, increased demand for video in a corporate environment may shift network usage in the corporate network from small transactional payloads to large distributed payloads. In turn, the corporate network may be overburdened by the payloads, resulting in an impaired video experience and/or an inability of business-critical traffic to reach devices in the corporate network.

Some companies have tried to solve this problem by creating distributed content delivery networks. In a distributed content delivery network, clients may act as peers that share content among one another. Once a client receives a file from a central server, that client becomes a potential server for that file to other clients. As clients download the content, the number of potential servers for the content grows, allowing subsequent clients to obtain the content from the Local Area Network (LAN) instead of a Wide Area Network (WAN) and reducing congestion between the clients and the WAN.

On the other hand, bandwidth and/or processor utilization may continue to impact the playback of content at individual clients. For example, video of a live event may be streamed to hundreds or thousands of clients across multiple networks and/or physical locations. As the number of clients, networks, and/or locations grows, the likelihood that one or more clients and/or networks are misconfigured or unavailable increases. Moreover, differences in bandwidth among clients may cause difficulties in selecting an appropriate bit rate for content to be shared among a set of peers.

SUMMARY

The disclosed embodiments provide a system that facilitates broadcast transmission in a distributed content delivery network. The system includes a node in the distributed content delivery network that plays a content stream received over the distributed content delivery network. The node includes a leadership-management apparatus that identifies the node as a peer leader in a local network of the distributed content delivery network. The node also includes a broadcasting apparatus. Upon identification of the node as the peer leader, the broadcasting apparatus obtains the content stream from a content source, broadcasts the content stream to other nodes in the local network, and adjusts a bit rate of the content stream based on one or more attributes associated with obtaining the content stream from the content source.

In some embodiments, the leadership-management apparatus also identifies the node as a recipient of the content stream from the peer leader. Upon identification of the node as the recipient of the content stream, the broadcasting apparatus selects a best available bit rate for receiving the content stream from the peer leader or one or more other peer leaders accessible to the node.

In some embodiments, identifying the node as the peer leader for the set of nodes includes obtaining one or more values of a node characteristic from one or more of the other nodes in the local network, and selecting the node as the peer leader based on a value of the node characteristic for the node and the one or more values of the node characteristic from the one or more of the other nodes.

In some embodiments, identifying the node as the peer leader for the set of nodes further includes broadcasting a status of the node as the peer leader, and transmitting the status of the node as the peer leader to one or more clients of the peer leader on one or more subnets of the local network, wherein the status is broadcast by the one or more clients to other clients in the one or more subnets.

In some embodiments, identifying the node as the peer leader for the set of nodes further includes resetting the value of the node characteristic for the node to facilitate a selection of the peer leader from the one or more of the other nodes upon detecting a degradation associated with obtaining the content stream from the content source.

In some embodiments, the one or more attributes include a network latency, a result of a burst bandwidth test, or a buffer fullness.

In some embodiments, using the node to play the content stream includes providing the content stream to a player on the node without notifying the player of the bit rate.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
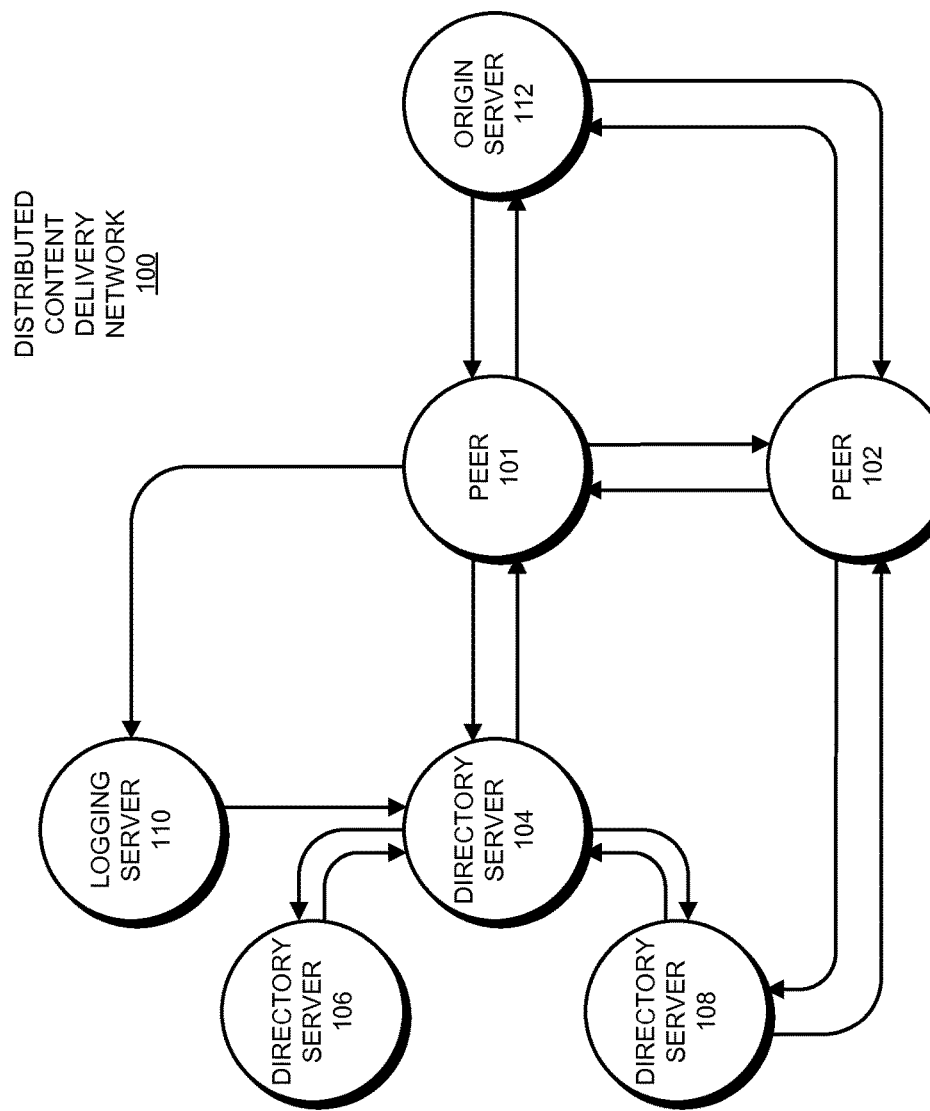
FIG. 1 shows a schematic of a system in accordance with the disclosed embodiments.

FIG. 1 illustrates a distributed content delivery network 100 in accordance with an embodiment of the present invention. Distributed content delivery network 100 contains peer 101 and peer 102. Peers 101 and 102 may be network-enabled electronic devices such as personal computers, laptop computers, tablet computers, mobile phones, and/or personal digital assistants that act as nodes on distributed content delivery network 100. More specifically, peers 101 and 102 may act as both clients and candidate servers that serve content to other clients. FIG. 1 also contains directory servers 104, 106 and 108, logging server 110, and origin server 112. Servers 104, 106, 108, 110 and 112 may be physical and/or virtual servers that service requests from clients (e.g. peers 101-102) in distributed content delivery network 100.

In one or more embodiments, peer 101 sends a request for content to directory server 104. The content may include streaming media such as video, audio, and/or multimedia. For example, peer 101 may request streaming video content during a live event such as a presentation, announcement, corporate meeting, ceremony, speech, news broadcast, and/or sporting event. Alternatively, peer 101 may request video and/or audio content on demand from directory server 104.

Directory server 104 may optionally forward or redirect the request to directory server 106 or directory server 108. One or more directory servers 104-108 may process the request by sending a list of potential candidate servers back to peer 101. Note that any time a peer makes a request for content, that peer becomes a potential candidate server for the content and may appear in the list of potential candidate servers that is forwarded to other clients. This list of potential candidate servers may optionally identify origin server 112, which may act as the original source for the content and/or a server that mirrors content from the original source.

Peer 101 may use the list to request content from peer 102, origin server 112, and/or another candidate server in the list. During receipt of the content, peer 101 may provide feedback information to logging server 110, including the portions of content received and the servers from which peer 101 has attempted to download the content. Logging server 110 may subsequently forward the feedback information from peer 101 to directory server 104, and directory server 104 may use the feedback information to process future requests for the content. The components of FIG. 1 are described in further detail below in a co-pending non-provisional application by inventors Wade L. Hennessey and John B. Wainwright, entitled "Method and Apparatus for Establishing Peering Rules for Distributed Content Delivery," having Ser. No. 10/611,783, and filing date 30 Jun. 2003, which is incorporated herein by reference.

Figure 2:
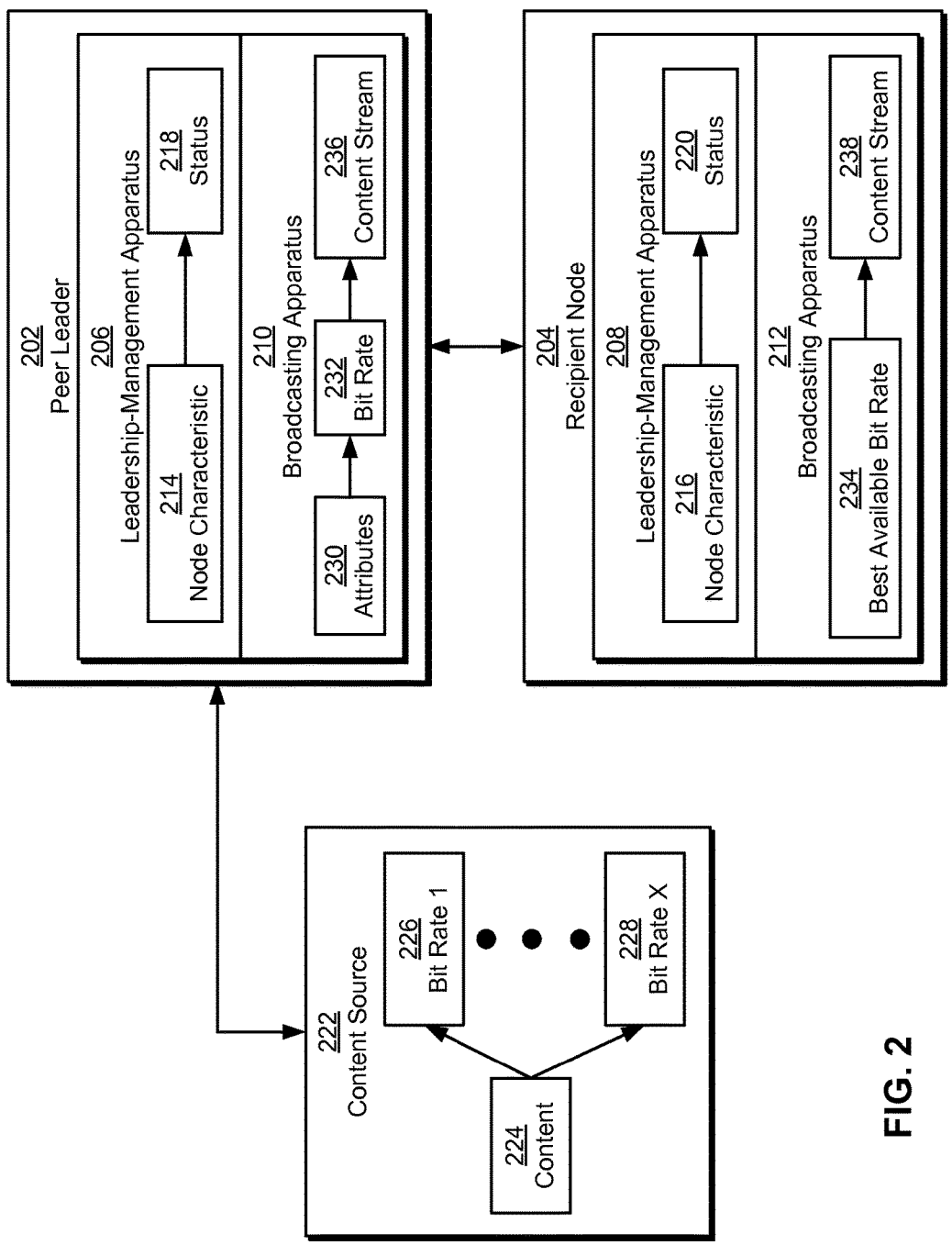
FIG. 2 shows a system for facilitating broadcast transmission in a distributed content delivery network in accordance with the disclosed embodiments.

FIG. 2 shows a system for facilitating broadcast transmission in a distributed content delivery network (e.g., distributed content delivery network 100 of FIG. 1) in accordance with the disclosed embodiments. As shown in FIG. 2, content 224 (e.g., video, audio, multimedia, etc.) from a content source 222 such as an origin server (e.g., origin server 112 of FIG. 1) may be provided to a set of nodes in the distributed content delivery network, including a peer leader 202 and a recipient node 204. For example, content 224 from content source 222 may be broadcast as one or more content streams (e.g., content streams 236-238) to nodes in the distributed content delivery network with a pre-specified lag (e.g., 30 seconds) behind a live event from which content 224 is recorded or generated. Alternatively, content 224 from one or more media files may be streamed on demand to one or more nodes in the distributed content delivery network.

Peer leader 202 and recipient node 204 may be peers (e.g., peers 101 and 102 of FIG. 1) in the distributed content delivery network. For example, peer leader 202 and recipient node 204 may each include a native media delivery application running on an electronic device that obtains content from the distributed content delivery network, plays the content to a user of the electronic device, and/or provides the content to other nodes in the distributed content delivery network. Peer leader 202 may obtain content 224 as content stream 236 from content source 222 and/or another content source outside the local network on which peer leader 202 resides. In turn, peer leader 202 may broadcast content stream 236 to other nodes and/or peers in the local network, including recipient node 204. Because content 224 may be sent only once to the local network, bandwidth consumption between the local network and a Wide Area Network (WAN) from which the content is received may be reduced.

In addition, content stream 236 may be transmitted from peer leader 202 to recipient node 204 and other nodes in the local network along a structured transmission chain. For example, each node in the local network may have a predefined serving capacity of 8-12 other nodes. After a node (e.g., recipient node 204) connects to peer leader 202 for content stream 236, the serving capacity of peer leader 202 may be reduced by one. If peer leader 202 has no remaining serving capacity (e.g., after the maximum number of nodes has connected to peer leader 202), peer leader 202 may delegate responsibility to serve content stream 236 to the nodes connected to peer leader 202. In turn, the nodes may announce their serving capacity to other nodes in the local network until the nodes no longer have serving capacity and delegate the responsibility to other nodes in the local network. Consequently, nodes in the local network may form a tree-like structure through which content stream 236 is served, as described in further detail below with respect to FIG. 3.

In one or more embodiments, membership of a node (e.g., peer leader 202, recipient node 204, etc.) in the local network is dynamically determined based on limits on network hops, round-trip times (RTTs), and/or other network characteristics associated with packet transmission in the local network. For example, a node may belong to a local network if the node can reach every other node in the local network in less than a pre-specified number of milliseconds or network hops. Consequently, the local network may include more nodes and/or network components than conventionally defined local area networks (LANs) that are limited to individual broadcast domains. For example, the local network may include multiple broadcast domains, switches, and/or LANs in the same building because network packets may be transmitted among electronic devices in the building at full bandwidth.

Moreover, a node may be eligible for membership in two or more local networks if the node is reachable within the pre-specified time and/or number of hops from multiple local networks. If the node can be included in more than one local network, the node may select a local network to join and receive content 224 through the selected local network. Conversely, if the node cannot reach every other node in any preexisting local network, the node may form a separate local network for other nodes to join.

Within the local network, peer leader 202 may be selected from a set of nodes based on one or more node characteristics (e.g., node characteristics 214-216) of the nodes. More specifically, peer leader 202, recipient node 204, and/or other nodes that may be candidates for peer leader 202 in the local network may share their node characteristics with one another, and leadership-management apparatuses 206-208 in peer leader 202, recipient node 204, and/or the other nodes may select the node with the best node characteristic as peer leader 202.

For example, multiple peers may obtain content 224 as content streams (e.g., content streams 236-238) from content source 222 and/or one another before peer leader 202 is selected. As a result, peer leader 202 may be selected as the node in the local network with the fullest buffer of content 224, as determined by the number of bytes and/or seconds of content 224 in the buffers of the candidate peer leaders. Identification of peer leader 202 may alternatively or additionally be based on the longest direct or indirect connection to content source 222, as determined by a timestamp representing the time at which each node initially connected to content source 222 and/or another node with a path to content source 222. On the other hand, recipient node 204 may not be selected as peer leader 202 because recipient node 204 may have a less full buffer, shorter connection to content source 222, and/or other node characteristic 216 that is less desirable for peer leadership than node characteristic 214 of peer leader 202.

If two or more nodes have identical node characteristics that produce a tie for peer leader 202, the leadership-management apparatus in each node may use a separate mechanism to break the tie and select a single node as a peer leader. For example, the tie may be broken by calculating a closeness between a globally unique identifier (GUID) for each node in the tie and a media object identifier (MOID) for content 224 and selecting peer leader 202 as the node with the closest GUID to the MOID for content 224.

Node characteristics (e.g., node characteristics 214-216) for identifying peer leader 202 may further be selected to maintain stability once peer leader 202 is selected. For example, selection of peer leader 202 based on buffer fullness and/or connection time to content source 222 may prevent nodes that have recently joined the local network from taking over as peer leader 202 because the recently joined nodes are unlikely to have buffers that are fuller and/or connection times that are longer than those of peer leader 202.

On the other hand, node characteristic 214 may be reset by peer leader 202 upon detecting a degradation associated with obtaining content 224 from content source 222. For example, if peer leader 202 does not have enough bandwidth to receive content 224 from content source 222 at a rate that maintains normal playback of content 224, peer leader 202 may reset the timestamp representing the initial connection time of peer leader 202 to content source 222 to the current time. In turn, any other peer with a preexisting connection to content source 222 may have an earlier initial connection time to content source 222 and take over as peer leader 202. Alternatively, peer leader 202 may continue receiving content stream 236 directly from content source 222 if peer leader 202 is the only peer in the local network that is connected to content source 222.

After peer leader 202 is identified based on node characteristic 214, leadership-management apparatus 206 may announce the leadership status 218 of peer leader 202 to other peers in the local network, such as recipient node 204, which has a different status 220 as a recipient of content stream 236 from peer leader 202. First, peer leader 202 may broadcast status 218 to nodes on the same subnet as peer leader 202. To communicate status 218 to other subnets in the local network, peer leader 202 may transmit status 218 via a direct connection to a client in each subnet, and the client may relay status 218 to other nodes in the subnet by broadcasting status 218 to the subnet.

In one or more embodiments, content source 222 provides content 224 at a number of bit rates (e.g., bit rate 1 226, bit rate x 228) to peer leader 202 and/or other peer leaders in the distributed content delivery network. For example, content source 222 may provide video content 224 at bit rates corresponding to 240p, 360p, 480p, 720p, and/or 1080p video quality. Each bit rate may be associated with a different format MOID, while the collection of bit rates for the same content 224 may be assigned the same unique content MOID.

A broadcasting apparatus 210 in peer leader 202 may select and/or adjust a bit rate 232 for content stream 236 based on one or more attributes 230 associated with obtaining the content stream from content source 222. For example, broadcasting apparatus 210 may examine network packets containing content 224 to determine attributes 230 such as a network latency associated with receiving the network packets from content source 222 and/or perform a burst bandwidth test of network packets from content source 222. Broadcasting apparatus 210 may also monitor a buffer containing content stream 236 to determine additional attributes 230 such as the fullness of the buffer and/or an increase or decrease in the fullness of the buffer. Broadcasting apparatus 210 may then use the network latency, result of the burst bandwidth test, buffer fullness, and/or changes to buffer fullness to select bit rate 232 so that content stream 236 is obtained at the highest possible bit rate 232 that does not incur buffering and/or other impaired playback of content 224.

Broadcasting apparatus 210 may also adjust bit rate 232 in response to changes in available bandwidth and/or other attributes 230. For example, a reduction in available bandwidth and/or buffer fullness for peer leader 202 may trigger a reduction in bit rate 232 to the next lowest bit rate from content source 222, while an increase in available bandwidth and/or buffer fullness for peer leader 202 may result in an increase in bit rate 232 to the next highest bit rate from content source 222. Such changes in bit rate 232 may be performed after the current bit rate 232 has been used for a pre-specified period to prevent frequent changes to bit rate 232 and/or temporary fluctuations in bandwidth, latency, and/or other attributes 230 from triggering a change in bit rate 232. For example, peer leader 202 may receive content stream 236 at a selected bit rate 232 for a pre-specified number of seconds to establish a new connection with content source 222 and/or receive a certain amount of data for content stream 236 at bit rate 232 before broadcasting apparatus 210 determines if a different bit rate should be used with content stream 236.

Once a change in bit rate 232 is made by broadcasting apparatus 210, data for content stream 236 at the new bit rate 232 is received in the same buffer as data for content stream 236 at the previous bit rate. The fullness of the buffer may then be calculated according to the different bit rates in the buffer. For example, the buffer may be full if the buffer contains 30 seconds of content stream 236. Broadcasting apparatus 210 may lower bit rate 232 from 800 kb/s to 400 kb/s once the fullness of buffer falls to 20 seconds of content stream 236 at 800 kb/s. After bit rate 232 is halved, broadcasting apparatus 210 may receive twice as many seconds of content stream 236 in the same amount of data, so that after five seconds the buffer contains 15 seconds of content stream 236 at 800 kb/s and nine seconds of content stream 236 at 400 kb/s, for a buffer fullness of 24 seconds. To distinguish data of different bit rates from one another and calculate buffer fullness, broadcasting apparatus 210 may match the format MOIDs of data for content stream 236 to the bit rates represented by the format MOIDs. If broadcasting apparatus 210 is subsequently able to keep the buffer full or close to full at the 400 kb/s bit rate 232 for a pre-specified period (e.g., 12 seconds), broadcasting apparatus 210 may attempt to increase bit rate 232 back to 800 kb/s. Broadcasting apparatus 210 may continue using the 800 kb/s bit rate 232 while content stream 236 is received quickly enough to keep the buffer full or close to full. If the fullness of the buffer drops below a pre-specified threshold and/or decreases by a pre-specified amount, broadcasting apparatus 210 may drop back down to the 400 kb/s bit rate 232.

As mentioned above, peer leader 202 may broadcast content stream 236 to recipient node 204 and/or other nodes in the same local network. As a result, all nodes connected to peer leader 202 may receive their content streams (e.g., content stream 238) at the same bit rate 232 as content stream 236. Conversely, recipient node 204 and/or other recipient nodes in the local network may select a best available bit rate (e.g., best available bit rate 234) for receiving a content stream (e.g., content stream 238) from peer leader 202 and/or other peer leaders accessible to the recipient nodes. For example, multiple peer leaders may be available to recipient node 204 if recipient node 204 is eligible to join multiple local networks and/or if a single local network of which recipient node 204 is a member temporarily has multiple peer leaders (e.g., during a leadership negotiation and/or leadership change among nodes in the local network). Recipient node 204 may select best available bit rate 234 for content stream 238 as the highest bit rate provided by the peer leaders that allows for normal playback of content 224 on recipient node 204.

Those skilled in the art will appreciate that bit rate 232 provided by peer leader 202 may be too high for normal playback on recipient node 204. For example, recipient node 204 may have less available bandwidth than peer leader 202, resulting in buffering and/or stalling during download and playback of content stream 236 from peer leader 202 on recipient node 204. Alternatively, such buffering and/or stalling may be caused by the inability of peer leader 202 to download content stream 236 at a fast-enough rate from content source 222. To mitigate playback issues associated with the inability of recipient node 204 and/or peer leader 202 to support bit rate 232, recipient node 204 may attempt to become peer leader 202 of the same local network and/or a different local network. Alternatively, as mentioned above, peer leader 202 may reset node characteristic 214 upon detecting degradation associated with obtaining content 224 from content source 222 (e.g., if the serving bandwidth to recipient node 204 and/or other recipient nodes falls below the bit rate of content stream 236). As a result, peer leadership may be passed around the local network until peer leader 202 represents the most bandwidth-limited node on the local network, which allows bit rate 232 and content stream 236 from peer leader 202 to be used by all other nodes on the local network because the other nodes have more bandwidth than peer leader 202.

Content streams (e.g., content streams 236-238) received by nodes in the local network may further be provided to players on the nodes without notifying the players of the bit rates (e.g., bit rate 232, best available bit rate 234) of the content streams. For example, each node may hide the bit rate of the received content stream from the player on the node by decoding the content stream into an uncompressed form that can be played by the player. Alternatively, the node may re-encode the content stream at a standard bit rate before providing the content stream to a player on the node. Consequently, bit rate adaptation in the distributed content delivery network may be performed without knowledge or input at the player level.

Such dynamic adaptation of bit rate 232 may allow peer leader 202 to use additional information (e.g., network latency, buffer fullness, etc.) available to peer leader 202 to manage network issues associated with receiving content 224 from content source 222 without relinquishing peer leadership in the local network. For example, peer leader 202 may reduce bit rate 232 in response to an increase in network latency to prevent buffering and/or stalling during playback of content stream 236, which may result in loss of peer leadership. In turn, adaptive bit rate streaming by peer leader 202 may provide a better playback experience than conventional adaptive bit rate streaming that is performed by a player with no network information. Moreover, mechanisms for selecting and/or challenging peer leader 202 may ensure that other nodes in the local network are also able to stream and play content 224 at the same bit rate 232 as peer leader 202. In other words, the system of FIG. 2 may perform adaptive bit rate streaming during broadcast of content 222 in a peer-based distributed content delivery network.

Those skilled in the art will appreciate that the system of FIG. 2 may be implemented in a variety of ways. In particular, content source 222 may be provided by a number of hardware and/or software components. For example, content source 222 may be a central origin server that acts as the original source for content 224, a caching origin server that contains a copy of content 224 from the central origin server, and/or a WAN peer that obtains content 224 from an origin server and/or another WAN peer and provides content 224 to peer leader 202 across a WAN.

Moreover, the components of peer leader 202, recipient node 204, and/or other nodes in the distributed content delivery network may be implemented together and/or separately by one or more hardware and/or software components and/or layers. For example, leadership-management apparatus 206 and broadcasting apparatus 210 may be provided by the same hardware or software component, or leadership-management apparatus 206 and broadcasting apparatus 210 may be implemented by separate components.

Figure 3:
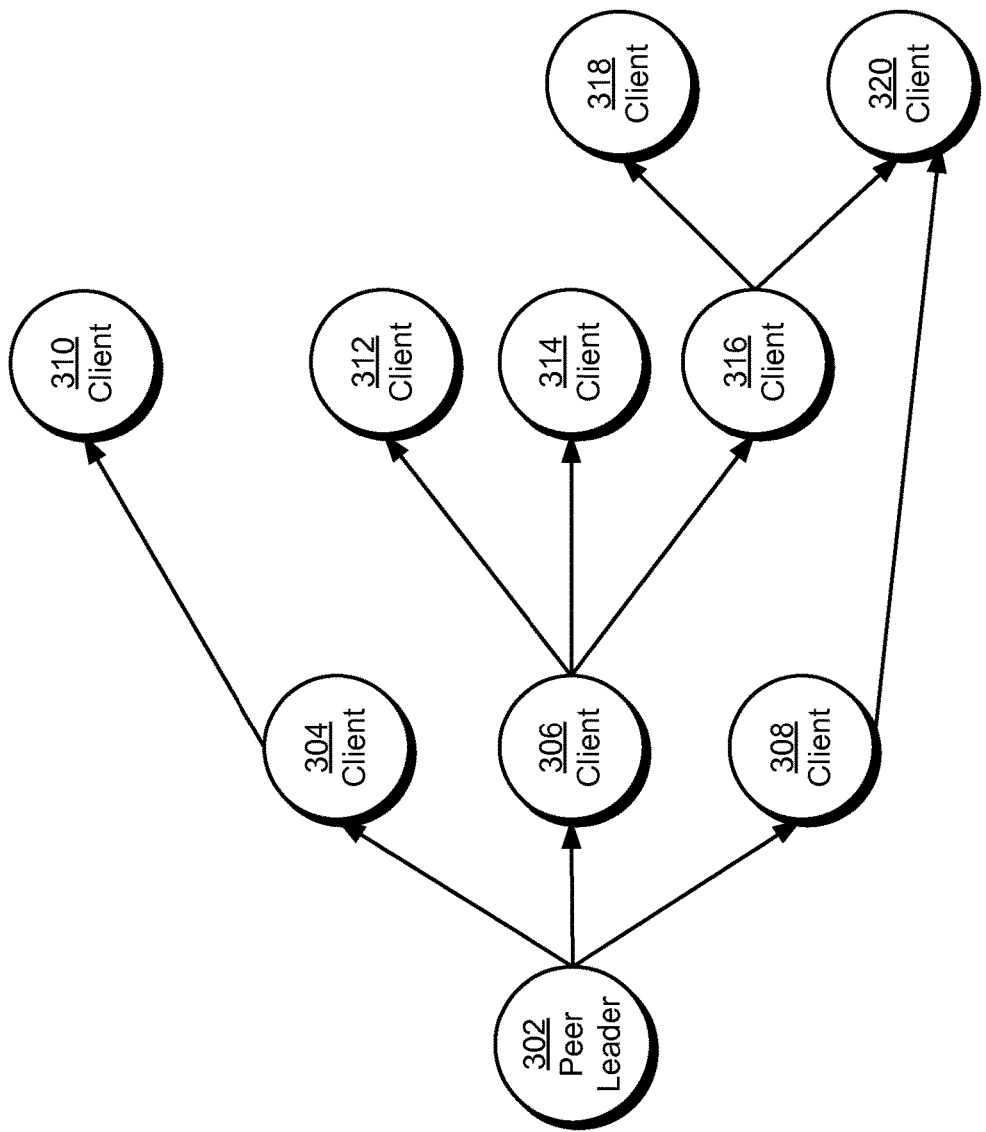
FIG. 3 shows an exemplary transmission chain for transmitting content to a set of nodes in a local network of a distributed content delivery network in accordance with the disclosed embodiments.

FIG. 3 shows an exemplary transmission chain for transmitting content to a set of nodes in a local network of a distributed content delivery network in accordance with the disclosed embodiments. The content may be obtained as a content stream from a content source outside the local network by a peer leader 302. The content stream may then be broadcast from peer leader 302 to a set of clients 304-320 in the local network so that the content is concurrently streamed and/or played on all nodes in the local network.

As mentioned above, each node in the local network may have a pre-specified serving capacity. For example, peer leader 302 and clients 304-320 may be configured to serve a maximum of three other clients in the local network. Once a node's serving capacity is consumed, the node may instruct one or more other nodes served by the node to announce their serving capacities, thereby delegating responsibility to serve content to the other nodes. As a result, the instruction to announce a node's serving capacity may be passed from peer leader 302 to one or more clients 304-320 until the instruction reaches a node with available serving capacity.

As shown in FIG. 3, peer leader 302 provides content to three clients 304-308 that take up the serving capacity of peer leader 302. Peer leader 302 may thus periodically instruct one or more clients 304-308 to advertise their serving capacities to other nodes in the local network, including nodes that have recently joined the local network. After the serving capacities of clients 304-308 are announced, client 304 may serve content to one other client 310 and have a remaining serving capacity of two. In turn, client 310 may serve content to zero other clients and have a remaining serving capacity of three, which may be announced by client 310 after two more clients connect to client 304 to obtain content from client 304. Client 308 may serve content to one other client 320 and have a remaining serving capacity of two. Because clients 304 and 308 have serving capacity, clients 304 and 308 may continue announcing their serving capacities to the local network to allow other nodes in the local network to connect to the clients and obtain content from the clients.

Client 306 may serve content to three other clients 312-316 and have a remaining serving capacity of zero. As a result, the instruction to announce serving capacity may be passed from peer leader 302 to client 306 to clients 312-316. After the serving capacities of clients 312-316 are announced, client 316 may serve content to two other clients 318-320 and have a remaining serving capacity of one, while clients 312-314 and 318-320 have full serving capacities of three each because clients 312-314 and 318-320 do not currently serve content to other nodes.

Peer leader 302 and clients 304-320 may thus form a graph-like transmission chain along which content from the content source is transmitted. For example, peer leader 302 may act as the root of the transmission chain by obtaining the content from the content source and broadcasting the content to clients 304-308. After the content is received by clients 304-308, client 304 may broadcast the content to client 310, client 306 may broadcast the content to clients 312-316, and client 308 may broadcast the content to client 320. After receiving the content from client 306, client 316 may broadcast the content to clients 318-320. To ensure that any subset of clients 302-320 has the capacity to serve another client, each client's serving may be required to exceed the number of sources of content used by the client. For example, client 320 may have a serving capacity of more than two because client 320 receives content from two clients 308 and 316. Consequently, the transmission chain may allow all nodes in the local network to receive content without overloading individual nodes in the local network with requests for the content.

Figure 4:
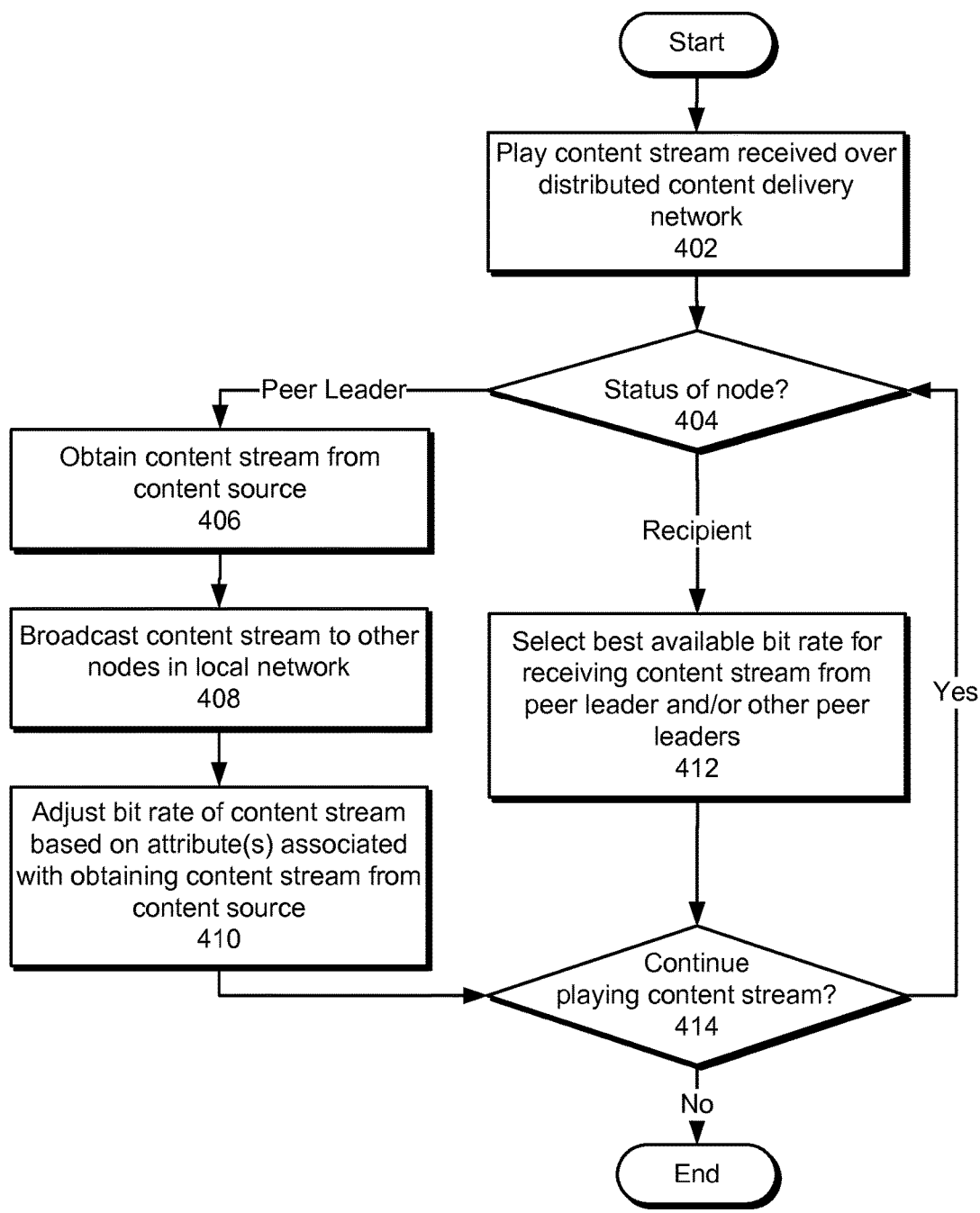
FIG. 4 shows a flowchart illustrating the process of facilitating broadcast transmission in a distributed content delivery network in accordance with the disclosed embodiments.

FIG. 4 shows a flowchart illustrating the process of facilitating broadcast transmission in a distributed content delivery network in accordance with the disclosed embodiments. More specifically, FIG. 4 shows a flowchart of operating a node in a distributed content delivery network. In one or more embodiments, one or more of the steps may be omitted, repeated, and/or performed in a different order. Accordingly, the specific arrangement of steps shown in FIG. 4 should not be construed as limiting the scope of the embodiments.

Initially, the node is used to play a content stream received over the distributed content delivery network (operation 402). For example, the node may be used to play audio and/or video of a live event with a pre-specified lag behind the live event. Next, the node may be operated based on a status of the node (operation 404) as a peer leader in a local network of the distributed content delivery network or a recipient of the content stream from the peer leader. Identification of the node as a peer leader or recipient of the content stream from the peer leader may be performed by the node and/or other nodes in the same local network and is described in further detail below with respect to FIG. 5.

If the node is a peer leader, the node is used to obtain the content stream from the content source (operation 406). For example, the node may download the content stream from an origin server and/or WAN peer outside the node's local network. Next, the node is used to broadcast the content stream to other nodes in the local network (operation 408). As mentioned above, the content stream may be broadcast to the other nodes by transmitting the content stream to a first subset of the other nodes directly connected to the node. The content stream may then be relayed to the remainder of the other nodes along a transmission chain containing the subset and one or more additional subsets of the other nodes connected directly or indirectly to the first subset.

The node is also used to adjust a bit rate of the content stream based on one or more attributes associated with obtaining the content stream from the content source (operation 410). For example, the bit rate of the content stream may be increased or decreased based on attributes such as network latency and/or buffer fullness. The content stream at the selected bit rate may then be provided to other nodes connected, directly or indirectly, to the peer leader, so that all nodes connected to the peer leader receive the content stream at the same bit rate. In addition, the content stream may be provided to a player on each node without notifying the player of the bit rate.

Conversely, if the node is a recipient of the content stream from the peer leader, the node is used to select the best available bit rate for receiving the content stream from the peer leader and/or other peer leaders accessible to the node (operation 412). For example, the node may select the highest available bit rate from one or more peer leaders in one or more local networks the node is eligible to join that allows for normal playback of the content stream on the node.

The content stream may continue to be played (operation 414) on the node. For example, the content stream may be obtained and played by the node until playback of the content stream on the node is stopped and/or the end of the content stream is reached. If the content stream is to be played, the status of the node (operation 404) is used to operate the node as a peer leader (operations 406-410) or a recipient of the content stream from the peer leader (operation 412). The node may thus be operated until the node is no longer used to play the content stream.

Figure 5:
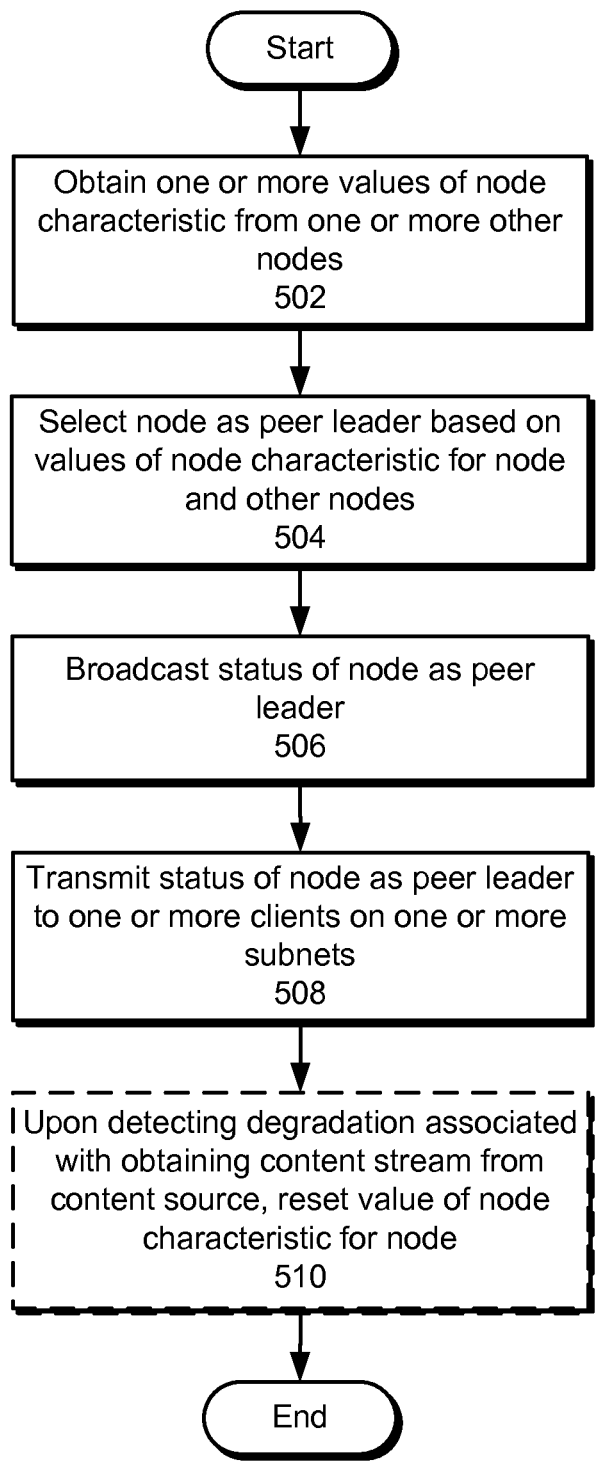
FIG. 5 shows a flowchart illustrating the process of identifying a status of a node in a distributed content delivery network in accordance with the disclosed embodiments.

FIG. 5 shows a flowchart illustrating the process of identifying a status of a node in a distributed content delivery network in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, the node is used to obtain one or more values of a node characteristic from one or more other nodes (operation 502) in the same local network as the node. For example, the node and/or the other nodes may share timestamps with one another; each timestamp may represent the duration of receipt of a content stream at a node (e.g., the length of the node's connection to a content source containing the content stream). Next, the node is selected as the peer leader based on the values of the node characteristic for the node and the other nodes (operation 504). Continuing with the above example, the node may be selected as the peer leader because the node has been receiving the content stream from the content source for the longest time.

After the node is selected as the peer leader, the node is used to broadcast the status of the node as the peer leader (operation 506). For example, the node may broadcast its status as peer leader to other nodes in the same subnet as the peer leader. The node may also transmit its status as peer leader to one or more clients on one or more subnets (operation 508) of the local network, such as clients on other subnets of the local network. In turn, the client(s) may broadcast the node's status as peer leader to other clients in the other subnet(s) to notify the other clients of the identity of the peer leader.

Finally, the node may optionally reset its value of the node characteristic upon detecting degradation associated with obtaining the content stream from the content source (operation 510). For example, the node may set the timestamp representing the node's initial connection to the content source to the current time if the node is unable to obtain the content stream from the content source at a rate that supports normal (e.g., unimpaired) playback of the content stream, with or without adapting the bit rate of the content stream. By resetting the value of its node characteristic, the node may facilitate the subsequent selection of the peer leader from the other nodes (e.g., during subsequent and/or periodic leadership-determination rounds among the nodes in the local network).

Figure 6:
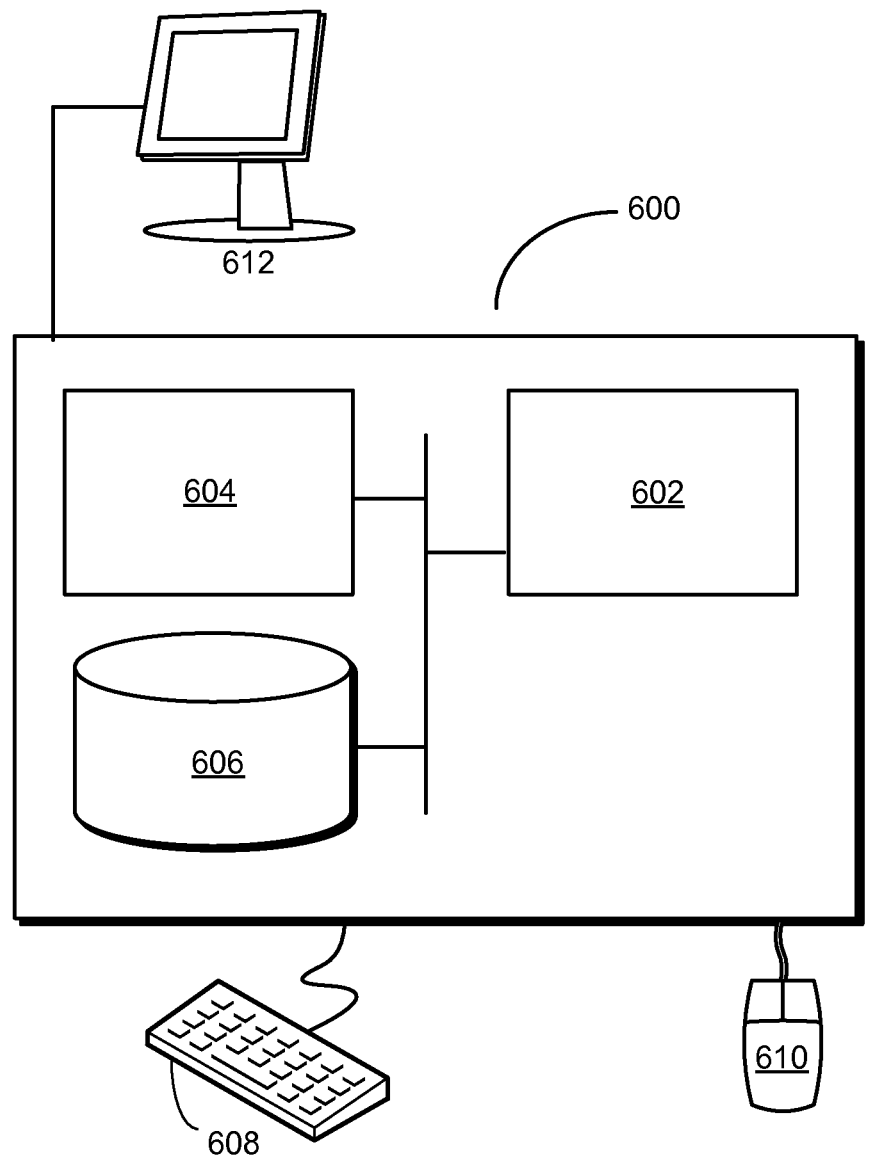
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating broadcast transmission in a distributed content delivery network. The system includes a node in the distributed content delivery network, which plays a content stream received over the distributed content delivery network. The node may include a leadership-management apparatus that identifies the node as a peer leader in a local network of the distributed content delivery network and/or a recipient of the content stream from the peer leader.

The node may also include a broadcasting apparatus. Upon identification of the node as the peer leader, the broadcasting apparatus may obtain the content stream from a content source, broadcast the content stream to other nodes in the local network, and adjust a bit rate of the content stream based on one or more attributes associated with obtaining the content stream from the content source. Upon identification of the node as the recipient of the content stream from the peer leader, the broadcasting apparatus may select the best available bit rate for receiving the content stream from the peer leader or one or more other peer leaders in the local network.

In addition, one or more components of computer system 600 may be remotely located and connected to the other components over a network. Portions of the present embodiments (e.g., content source, nodes, leadership-management apparatus, broadcasting apparatus, etc.) may also be located on different nodes of a distributed system that implements the embodiments. For example, the present embodiments may be implemented using a cloud computing system that identifies a peer leader among a set of remote nodes and configures the peer leader to obtain a content stream from a remote content source, broadcast the content stream to other remote nodes in the same local network, and adjust the bit rate of the content stream based on attributes associated with obtaining the content stream from the content source.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating broadcast transmission in a distributed content delivery network, comprising:
 using a node in the distributed content delivery network to play a content stream received over the distributed content delivery network;
 upon identifying the node as a peer leader in a local network of the distributed content delivery network, using the node to:
  obtain the content stream from a content source;
  broadcast the content stream to other nodes in the local network; and
  adjust a bit rate of the content stream based on one or more attributes associated with obtaining the content stream from the content source, wherein the one or more attributes comprise a network latency, a result of a burst bandwidth test, or a buffer fullness;
 upon identifying the node as a recipient of the content stream from the peer leader, using the node to select a best available bit rate for receiving the content stream from the peer leader or one or more other peer leaders accessible to the node, wherein the bitrate of the content stream from the content source to the peer leader is different than the best available bit rate for receiving the content stream from the peer leader; and
 wherein a plurality of peer leaders receive the content stream from the content source at a plurality of different bit rates, and wherein the plurality of peer leaders broadcast the content stream to a plurality of other nodes at a plurality of different bit rates.

2. The computer-implemented method of claim 1, wherein identifying the node as the peer leader for the set of nodes comprises:
 obtaining, at the node, one or more values of a node characteristic from one or more of the other nodes; and
 selecting the node as the peer leader based on a value of the node characteristic for the node and the one or more values of the node characteristic from the one or more of the other nodes.

3. The computer-implemented method of claim 2, wherein identifying the node as the peer leader for the set of nodes further comprises:
 using the node to:
  broadcast a status of the node as the peer leader; and
  transmit the status of the node as the peer leader to one or more clients of the peer leader on one or more subnets of the local network, wherein the status is broadcast by the one or more clients to other clients in the one or more subnets.

4. The computer-implemented method of claim 2, wherein identifying the node as the peer leader for the set of nodes further comprises:
 upon detecting a degradation associated with obtaining the content stream from the content source, resetting the value of the node characteristic for the node to facilitate a selection of the peer leader from the one or more of the other nodes.

5. The computer-implemented method of claim 2, wherein the node characteristic comprises a duration of receipt of the content stream at the node.

6. The computer-implemented method of claim 1, wherein using the node to broadcast the content stream to the other nodes comprises:
 using the node to transmit the content stream to a first subset of the other nodes, wherein the content stream is relayed to the other nodes along a transmission chain comprising the first subset and one or more additional subsets of the other nodes.

7. The computer-implemented method of claim 1, wherein using the node to play the content stream comprises:
 providing the content stream to a player on the node without notifying the player of the bit rate.

8. A system for facilitating broadcast transmission in a distributed content delivery network, comprising:
 a node in the distributed content delivery network configured to play a content stream received over the distributed content delivery network, wherein the node comprises:
  a leadership-management apparatus configured to identify the node as a peer leader in a local network of the distributed content delivery network; and
  a broadcasting apparatus, wherein upon identification of the node as the peer leader, the broadcasting apparatus is configured to:
   obtain the content stream from a content source;
   broadcast the content stream to other nodes in the local network;
   adjust a bit rate of the content stream based on one or more attributes associated with obtaining the content stream from the content source, wherein the one or more attributes comprise a network latency, a result of a burst bandwidth test, or a buffer fullness;
 wherein the leadership-management apparatus is further configured to identify the node as a recipient of the content stream from the peer leader, and
 wherein upon identification of the node as the recipient of the content stream, the broadcasting apparatus is further configured to select a best available bit rate for receiving the content stream from the peer leader or one or more other peer leaders accessible to the node, wherein the bitrate of the content stream from the content source to the peer leader is different than the best available bit rate for receiving the content stream from the peer leader; and
 wherein a plurality of peer leaders receive the content stream from the content source at a plurality of different bit rates, and wherein the plurality of peer leaders broadcast the content stream to a plurality of other nodes at a plurality of different bit rates.

9. The system of claim 8, wherein identifying the node as the peer leader for the set of nodes comprises:
 obtaining one or more values of a node characteristic from one or more of the other nodes in the local network; and
 selecting the node as the peer leader based on a value of the node characteristic for the node and the one or more values of the node characteristic from the one or more of the other nodes.

10. The system of claim 9, wherein identifying the node as the peer leader for the set of nodes further comprises:

broadcasting a status of the node as the peer leader; and transmitting the status of the node as the peer leader to one or more clients of the peer leader on one or more subnets of the local network, wherein the status is broadcast by the one or more clients to other clients in the one or more subnets.

11. The system of claim 9, wherein identifying the node as the peer leader for the set of nodes further comprises:

upon detecting a degradation associated with obtaining the content stream from the content source, resetting the value of the node characteristic for the node to facilitate a selection of the peer leader from the one or more of the other nodes.

12. The system of claim 8, wherein using the node to play the content stream comprises:

providing the content stream to a player on the node without notifying the player of the bit rate.

13. A non-transitory computer-readable storage medium storing instructions that when executed by a computer cause the computer to perform a method for facilitating broadcast transmission in a distributed content delivery network, the method comprising:

using a node in the distributed content delivery network to play a content stream received over the distributed content delivery network;

upon identifying the node as a peer leader in a local network of the distributed content delivery network, using the node to:

obtain the content stream from a content source;

broadcast the content stream to other nodes in the local network; and adjust a bit rate of the content stream based on one or more attributes associated with obtaining the content stream from the content source, wherein the one or more attributes comprise a network latency, a result of a burst bandwidth test, or a buffer fullness;

upon identifying the node as a recipient of the content stream from the peer leader, using the node to select a best available bit rate for receiving the content stream from the peer leader or one or more other peer leaders accessible to the node, wherein the bitrate of the content stream from the content source to the peer leader is different than the best available bit rate for receiving the content stream from the peer leader; and wherein a plurality of peer leaders receive the content stream from the content source at a plurality of different bit rates, and wherein the plurality of peer leaders broadcast the content stream to a plurality of other nodes at a plurality of different bit rates.

14. The non-transitory computer-readable storage medium of claim 13, wherein identifying the node as the peer leader for the set of nodes comprises:

obtaining, at the node, one or more values of a node characteristic from one or more of the other nodes; and selecting the node as the peer leader based on the value of the node characteristic for the node and the one or more values of the node characteristic from the one or more of the other nodes.

* * * * *